United States Patent Office 3,714,911
Patented Feb. 6, 1973

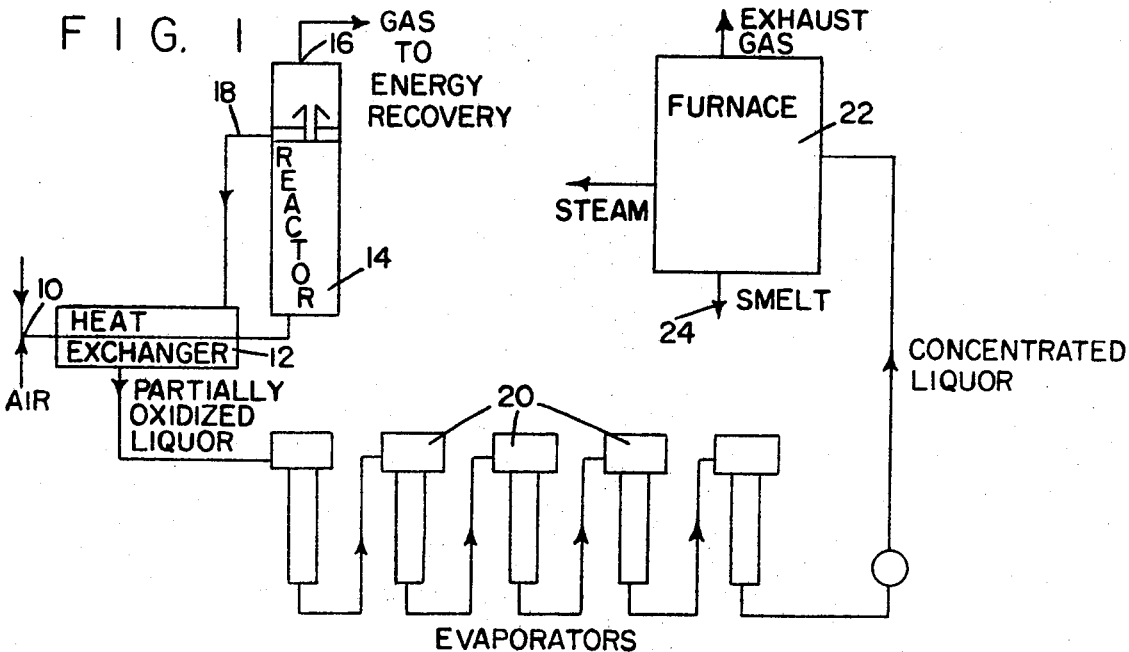
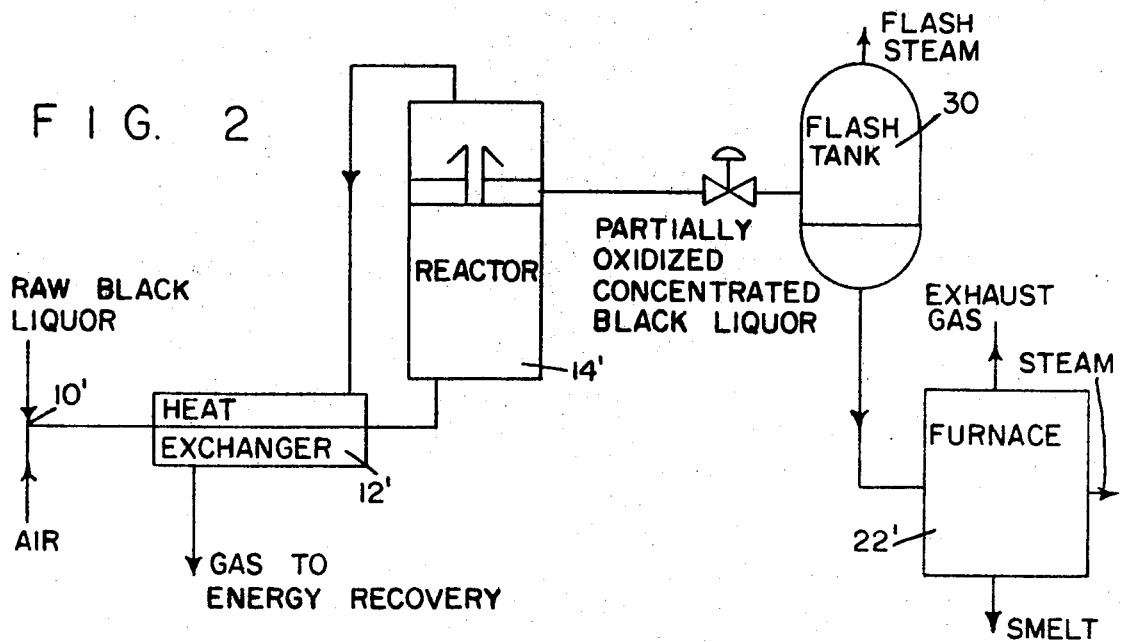
INVENTOR
LOUIS A. PRADT
BY *Charles R. Fay*,
ATTORNEY

3,714,911
METHOD OF TREATMENT OF ALKALINE PULP-ING BLACK LIQUORS BY WET AIR OXIDATION
Louis A. Pradt, Wausau, Wis., assignor to Sterling Drug Inc., New York, N.Y.
Filed Mar. 10, 1971, Ser. No. 122,787
Int. Cl. F23g 7/00
U.S. Cl. 110—7 R  2 Claims

ABSTRACT OF THE DISCLOSURE

Wet oxidation and evaporation of alkaline pulping black liquor by approximately a fifty percent oxidation, e.g., evaporating two pounds of water per pound of air, without the use of conventional evaporators, and passing the partially oxidized concentrated black liquor directly to the furnace, or interposing a flash steam tank between the reactor and the furnace.

BACKGROUND OF THE INVENTION

In a conventional system alkaline pulping black liquor is evaporated to a concentration of sixty to sixty-five percent solids and burned in a furnace. Pulping chemicals are recovered from the bottom of the furnace and steam is generated utilizing the heat of combustion of the organic matter in the black liquor.

When certain fibrous materials are pulped, for example eucalyptus or certain agricultural residues such as bamboo, the resulting black liquor becomes very viscous and concentration by conventional evaporation beyond fifty percent or even thirty-five percent solids is often impossible. Liquors from pulping agricultural residues often have a high silica content which causes the formation of difficult scales in the evaporators. For most black liquors scaling begins to occur at about fifty percent solids content. Also, most alkaline pulp mills employ the use of sulfur in the pulping chemicals and obnoxious odors are generated in the evaporators and in the furnace.

For treatment of black liquor containing no sulfur, that is a "zero sulfidity" pulping process, wet oxidation has been used. However, when black liquor containing sulfur is oxidized, the sulfur is oxidized to sulfate, which cannot easily be reduced to sulfide, the form necessary for pulping. Therefore, wet oxidation has not been generally applied to sulfur-containing black liquors. Alkaline pulp mills use sulfur in the so-called kraft pulping process.

However, a partial wet oxidation of kraft black liquor, known as "black liquor oxidation," is commonly practiced in modern mills in order to reduce odor emissions. This oxidation is done at atmospheric pressure and moderate temperatures in the range of approximately 200° F. There is very little reduction in chemical oxygen demand. The materials that are oxidized are mostly inorganic sulfer compounds in reduced form. It has also been demonstrated that the viscosity of black liquors such as those derived from eucalyptus pulping is greatly reduced by a partial wet oxidation. Swelling characteristics are also improved. A wet oxidation that removes ten to eighty percent of the chemical oxygen demand has been proposed for this purpose. The partially wet oxidized liquor is then evaporated and burned in a conventional black liquor evaporator-recovery boiler installation.

A conventional wet air oxidation unit operates to remove or evaporate about one pound of water per pound of air supplied.

This is demonstrated in the following example: In producing one ton of kraft pulp, generally 3000 lbs. of black liquor solids are recovered. The black liquor will contain eighteen percent total solids, or 13,600 lbs. of water per ton of pulp, and will amount to 1850 gallons per ton of pulp. The COD of the black liquor is 180 grams per liter. It can be shown that 6000 lbs. of air must be supplied to remove fifty percent of the COD of 1850 gallons of black liquor. Thus, 6000 lbs. of water will be evaporated in oxidizing 1850 gallons of black liquor to a degree that removes fifty percent of the COD.

In the usual evaporator-furnace system, the liquor is generally concentrated to a degree that results in a ratio of volatile matter to water of about 0.8. Although the liquor can be burned at lower concentrations, a higher concentration is desired for best economy and reliability of operation. In the raw black liquor about half of the solids are volatile, or in this case 1500 pounds. Thus, the liquor fed to the furnace should contain 1880 pounds of water, requiring pre-evaporation of 11,790 pounds of water. If conventional wet oxidation removing fifty percent of the COD is practiced as a pretreatment prior to evaporation, the volatile solids will be reduced to 750 pounds, 400 pounds of water will be formed by the oxidation and 6000 pounds of water will be evaporated. In order to maintain the ratio of volatile matter to water at 0.8, no more than 940 pounds of water should be present, requiring that 6190 pounds of water be evaporated prior to the furnace. Thus an evaporator installation is still required although the evaporators will be smaller than with the usual evaporator furnace installation.

REFERENCES (1) Morgan and Saul. The Zimmermann Process in a Soda Pulp Mill Recovery System. Development of a Commercial Process. Appita Vol. 22, No. 3 (November 1968).

(2) Wenzl, Hermann F. J. Kraft Pulping Theory and Practice.

(3) Schoeffel and Barton. Canadian Pat. 555,460 Apr. 1, 1958.

(4) United States Pat. 2,774,666.

SUMMARY OF THE INVENTION

This invention is an unconventional wet oxidation that of itself evaporates two pounds of water per pound of air prior to incineration in the furnace and thereby of air prior to incineration in the furnace and thereby the need for the usual multi-effect evaporators is eliminated.

Operating a wet oxidation unit so as to evaporate two pounds of water per pound of air supplied would be uneconomical. However, in this invention such operation eliminates the need for the multi-effect evaporators. Although the wet oxidation unit by itself would not be economical, elimination of the evaporators makes the system as a whole economical. This novel system eliminates the problems of high viscosity in concentrated raw black liquor and odors generated both in the evaporators and furnace of a conventional system. It is also believed that adoption of this invention will help prevent the black liquor boiler explosions that are common in this industry.

BRIEF DESCRIPTION OF THE DRAWINGS

FIG. 1 is a diagram illustrating the flow in the prior art, and

FIG. 2 is a like diagram illustrating the invention.

DESCRIPTION OF THE PRIOR ART—FIG. 1

FIG. 1 is largely self-explanatory in showing the prior art. The raw black liquor and air enter the system at 10, pass through the heat exchanger 12 to the reactor 14 wherein the heat and pressure are such as to evaporate about one pound of water per pound of air supplied. The gas produced is lead off at 16 as to an energy recovery system not shown, and the liquor flows out at 18, through the heat exchanger if desired, and thence, partially oxidized, it goes through a battery of evaporators 20 that remove enough water to allow the liquor to be burned in furnace 22 producing the pulping chemicals at 24.

This is demonstrated in the following example:

In producing one ton of kraft pulp, generally 3000 pounds of black liquor solids are recovered. The black liquor will contain eighteen precent total solids, or 13,670 pounds water per ton of pulp, and will amount to 1850 gallons per ton of pulp. The COD of the black liquor is 180 g./l. It can be shown that 6000 pounds of air must be supplied to remove fifty percent of the COD of 1850 gallons of black liquor. Thus, 6000 pounds of water will be evaporated in the wet oxidation portion of the system of FIG. 1.

PREFERRED EMBODIMENT OF THE INVENTION

Referring now to FIG. 2, the raw black liquor and air enter at 10', pass through heat exchanger 12', into the reactor 14', as before. However, the partially oxidized concentrated black liquor does not enter evaporators but can proceed directly to the furnace 22', because in this case the reactor is used to evaporate a much greater proprotion of water, e.g., two pounds of water per pound of air. A flash steam tank 30 can be interposed in the line between the reactor and the furance to evaporate more water. Also, the gas from the reactor can go to the heat exchanger 12' and thence to energy recovery.

The following example illustrates the operation of this system:

3000 pounds of black liquor solids, half volatile and half inorganic with 13,670 pounds of water, as in the previous example representing black liquor recovered from the production of one ton of pulp are fed to the wet oxidation unit. A fifty percent oxidation (COD reduction) is conducted requiring 6000 pounds of air. The system operates at 800 p.s.i.g. and a maximum of 487° F., resulting in the evaporation of 12,359 pounds of water. A further 780 pounds of water is evaporated by flashing. Since 400 pounds of water will be formed during the oxidation, 940 pounds of water will remain in the oxidized liquor, along with 750 pounds of volatile matter and 1500 pounds of inorganic material. This oxidized, concentrated liquor is suitable for direct injection into the furance where the remaining organic matter is burned and the inorganic chemicals form a smelt from which the pulping chemicals can be re-generated in the usual way .

The system can be operated at pressures from about 300 p.s.i.g., to about 3500 p.s.i.g. or more and temperatures from about 160° C. to 375° C. The preferred range is 500 to 1000 p.s.i.g. and 220 to 280° C. Oxidation can be from less than ten percent to more than ninety precent. The preferred range is forty to sixty percent.

I claim:

1. A process for treatment of alkaline pulping black liquor which comprises subjecting it to wet air oxidation at a pressure between 500 and 1000 p.s.i.g. and a temperature between 220° and 280° C., whereby the water from the black liquor is evaporated in a ratio of approximately two pounds of water per pound of air supplied, and then incinerating the residue in a furance.

2. The process recited in claim 1 including a further evaporation in a flash tank prior to the incineration.

References Cited

UNITED STATES PATENTS

| | | | |
|---|---|---|---|
| 3,207,572 | 9/1965 | Saul | 210—63 |
| 2,824,058 | 2/1958 | Zimmerman | 159—47 X |
| 2,903,425 | 9/1959 | Zimmerman | 210—63 |
| 3,515,200 | 6/1970 | Shah | 159—47 X |

KENNETH W. SPRAGUE, Primary Examiner